UNITED STATES PATENT OFFICE.

GUSTAF DALÉN, OF STOCKHOLM, SWEDEN.

STORING MASS FOR ACETYLENE GAS.

1,140,124.

Specification of Letters Patent. Patented May 18, 1915.

No Drawing. Application filed June 17, 1912. Serial No. 704,229.

*To all whom it may concern:*

Be it known that I, GUSTAF DALÉN, a subject of the King of Sweden, residing at Stadsgården 18, Stockholm, in the Kingdom of Sweden, have invented a certain new and useful Improvement in Storing Mass for Acetylene Gas, of which the following is a specification.

This invention relates to the storage of acetylene gas dissolved in acetone.

It has already been proposed to use a porous absorbent mass for storing compressed gaseous acetylene for the purpose of preventing the gas exploding. The absorbent mass is composed of silicious earth, charcoal and lime or cement, the latter being employed as an adhesive or binding substance, for which it is eminently suitable. If the acetylene gas to be stored be dissolved in acetone however, as is now a usual form in which acetylene gas is stored, it has been thought that lime or cement cannot be used partly because the capacity of the acetone to dissolve acetylene gas is diminished when in contact with such substances, and partly because the acetone chemically affects such substances. It has therefore been a practice to employ clay or a mixture of zinc oxid and zinc chlorid instead of lime or cement when storing acetylene dissolved in acetone.

The present opinion that lime is not capable of being employed when storing acetylene gas dissolved in acetone seems to be right. But experiments made by the applicant show nevertheless that cement can with advantage be used for the purpose, provided that it does not contain any free oxid such as for instance free alkaline earths. The said experiments have shown that it is the free oxids or free alkaline earths which affect the acetone and diminish its capacity of dissolving the acetylene gas so that lime alone is not capable of being employed under any circumstances for the said purpose.

The present invention has for object to provide a porous mass suitable for storing acetylene dissolved in acetone, employing cement as an adhesive or binding substance. According to the invention the kind of cement employed is hydraulic cement, and such that, when chemically analyzed, it is found not to contain any, or any appreciable amounts, of free oxids such as for instance free alkaline earths; or the cement employed has added to it substances which have the capacity of forming salts or double salts with any free oxids such as alkaline earths contained in the cement. As examples of such substances zinc chlorid, hydrous silicic acid, pozzuolanic material and the like may be mentioned.

The porous mass also contains as usual charcoal and silicious earth to which, if desired, in known manner may be added fibers of asbestos or the like for preventing the mass breaking when dried.

I claim—

1. A porous mass for storing acetylene dissolved in acetone, containing a hydraulic cement which does not contain free oxids.

2. A porous mass for storing acetylene dissolved in acetone containing a hydraulic cement in which the otherwise free oxids are bound by substances adapted to form compounds with the said oxids.

3. A porous mass for storing acetylene dissolved in acetone, containing hydraulic cement in which the otherwise free oxids are compounded with pozzuolanic material.

4. A porous mass for storing explosive gas dissolved in acetone, comprising charcoal, silicious earth and hydraulic cement which does not contain free oxids.

5. A porous mass for storing explosive gas dissolved in acetone, comprising charcoal, silicious earth, fibers of elastic material and hydraulic cement which does not contain free oxids.

6. A porous mass for storing explosive gas dissolved in acetone, comprising charcoal, silicious earth, fibers of elastic material, hydraulic cement and substances forming salts with free oxids.

In testimony whereof I affix my signature in presence of two witnesses.

GUSTAF DALÉN.

Witnesses:
WALDEMAR BOMAN,
S. SJOGREN.